(12) United States Patent
Kim et al.

(10) Patent No.: US 8,630,549 B2
(45) Date of Patent: Jan. 14, 2014

(54) VISIBLE LIGHT COMMUNICATION APPARATUS AND VISIBLE LIGHT COMMUNCIATION METHOD

(75) Inventors: Daeho Kim, Daejeon (KR); Taegyu Kang, Daejeon (KR); Sangkyu Lim, Daejeon (KR); Taewan Kim, Daejeon (KR); Myungae Chung, Daejeon (KR); Sungwon Sohn, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 635 days.

(21) Appl. No.: 12/574,843

(22) Filed: Oct. 7, 2009

(65) Prior Publication Data
US 2010/0135669 A1 Jun. 3, 2010

(30) Foreign Application Priority Data
Nov. 28, 2008 (KR) .................. 10-2008-0119698

(51) Int. Cl.
*H04B 10/00* (2013.01)

(52) U.S. Cl.
USPC .......................................... 398/172; 398/182

(58) Field of Classification Search
USPC ............................................................ 398/172
See application file for complete search history.

(56) References Cited

U.S. PATENT DOCUMENTS

| | | | | |
|---|---|---|---|---|
| 7,321,203 | B2 * | 1/2008 | Marosek ........................ | 315/247 |
| 7,689,130 | B2 * | 3/2010 | Ashdown ...................... | 398/172 |
| 8,050,572 | B2 * | 11/2011 | Kawabe et al. ............... | 398/202 |
| 8,107,825 | B2 * | 1/2012 | Rajagopal et al. ............ | 398/172 |
| 8,144,761 | B2 * | 3/2012 | Nakasha ........................ | 375/238 |
| 8,150,269 | B2 * | 4/2012 | Sauerlander et al. ......... | 398/172 |
| 2006/0239689 | A1 * | 10/2006 | Ashdown ...................... | 398/130 |
| 2007/0058987 | A1 | 3/2007 | Suzuki | |
| 2007/0092264 | A1 * | 4/2007 | Suzuki et al. ................. | 398/189 |
| 2009/0169215 | A1 * | 7/2009 | Sauerlander et al. ......... | 398/118 |
| 2009/0196613 | A1 * | 8/2009 | Linnartz ........................ | 398/78 |
| 2010/0135669 | A1 * | 6/2010 | Kim et al. ..................... | 398/130 |

FOREIGN PATENT DOCUMENTS

| | | | |
|---|---|---|---|
| JP | 2007-013485 A | 1/2007 | |
| JP | 2007-097071 A | 4/2007 | |
| JP | 2007-104722 A | 4/2007 | |
| JP | 2008-136138 A | 6/2008 | |
| KR | 1020040074846 A | 8/2004 | |
| KR | 1020060117413 A | 11/2006 | |

OTHER PUBLICATIONS

Hidemitsu Sugiyama, et al; "Brightness Control Methods for Illumination and Visible-Light Communication Systems", Proceedings of the Third International Conference on Wireless and Mobile Communications (ICWMC'07), Mar. 4-9, 2007, Guadeloupe.

* cited by examiner

*Primary Examiner* — Agustin Bello
(74) *Attorney, Agent, or Firm* — Nelson Mullins Riley & Scarborough LLP; Anthony A. Laurentano, Esq.; Chad Thorson, Esq.

(57) ABSTRACT

The visible light communication apparatus includes: a brightness signal generator that calculates a duty cycle of an driving signal corresponding to brightness requirement information and generates clock frequency information on brightness signals based on the calculated duty cycle; a transmission data generator that generates transmission data; an illumination driver that generates and outputs an driving signal in a pulse waveform based on the clock frequency information of the brightness signals and the transmission data and controls a pulse position of a turn on section for each bit unit time in the waveform of the driving signal based on the transmission data; and an illumination that is operated according to the driving signal from the illumination driver.

8 Claims, 6 Drawing Sheets

VISIBLE LIGHT COMMUNICATION APPARATUS AND VISIBLE LIGHT COMMUNCIATION METHOD

RELATED APPLICATIONS

The present application claims priority to Korean Patent Application Serial Number 10-2008-0119698, filed on Nov. 28, 2008, the entirety of which is hereby incorporated by reference.

BACKGROUND OF THE INVENTION

1. Field of the Invention

The present invention relates to a visible light communication apparatus and a visible light communication method, and more specifically, to an apparatus and method capable of performing visible wireless communication while controlling the brightness of LED illumination.

2. Description of the Related Art

Currently, the number of wired telephone subscribers, mobile communication subscribers, and Internet users are almost at saturated state, thus, there is a need to find new technologies by converging industries under the situation where the increase in the number of the subscribers stops. Due to the above situation, a new illumination industry in which an LED technology in 2007 had rapidly developed, including widely developed a wireless personal area network (WPAN) technology.

The international standard and development of the wireless personal area network have been progressed according to IrDA, IEEE 802.11x, IEEE 802.15 (Bluetooth, UWB, 60 GHz) etc.

As one technology of the wireless personal area network, Visible Light Communication (VCL) Interesting Group (IG) is newly established in IEEE 802.15 of Atlanta, US, on Nov. 15, 2007. A working group of visblible light communication in Telecommunications Technology Association (TTA) was configured and operated on May 30, 2007 prior to this within the country. The visible light (visible rays) is an area of an electromagnetic wave that is visible to human sight. A wavelength of visible light is approximately 380 to 780 nm. The change in property according to a wavelength is represented by each color within visible light. The wavelength of visible light is short as going from red to violet. Light having a wavelength longer than red is referred to as an infrared ray and light having a wavelength shorter than violet is referred to as an ultraviolet ray. In the case of monochromatic light, red is shown in a wavelength of approximately 700 to 610 nm, orange color is shown in a wavelength of approximately 610 to 590 nm, yellow is shown in a wavelength of approximately 590 to 570 nm, green is shown in a wavelength of approximately 570 to 500 nm, blue is shown in approximately 500 to 450 nm, and violet is shown in a wavelength of approximately 450 to 400 nm.

The visible wireless communication technology, which is a communication technology converging digital LED illumination light and communication, can confirm communication or not by eyesight, but does not harm the eyes of human beings, and can provide a physical security function, etc. Advantages of the visible wireless communication technology is that the LED can solve an environmental disruption problem due to mercury, has a life span 10 times or longer, and improves 90% in electric efficiency, etc. as compared to a fluorescent lamp and an incandescent lamp that are the existing illumination used. When the communication environment is created using the illumination infrastructure, it is considered that the communication world capable of obtaining an economic gain, expanding a multimedia communication service, and obtaining illumination in real life can be opened.

In illumination devices using the LED, the brightness of illumination is controlled using a pulse width modulation (hereinafter, referred to as PWM) scheme that can achieve the highest efficiency and the most precise current control. The PWM scheme, which is a scheme of controlling a ratio of on/off, controls time in a turned on state of the LED illumination to control the luminance of light. In principle, the LED illumination emits bright light when the lighting time is long and becomes dark when the lighting time is short.

However, the illumination device that controls brightness using the PWM scheme is difficult to use the visible light communication and the brightness of illumination cannot emit the desired brightness due to the visible wireless communication function. The illumination device using the PWM scheme turns on/off the LED illumination according to the turn on/off of the PWM signal. By this function, the collision with the visible light communication that performs communication by the turn on/off of light occurs in view of the operation method.

In other words, even when the communication is performed ("1" and "0" are irregularly changed at all times), the brightness (duty ratio of PWM) should constantly be maintained at all times (a ratio of "1" and "0" is always constant). However, It is difficult to combine the PWM signal for controlling brightness and the modulation signal for communication with the control signal for turning-on/off the LED. The PWM signal has a fixed waveform when the brightness is set, but the modulation signal for communication is continuously changed according to a data pattern.

Figure 1:
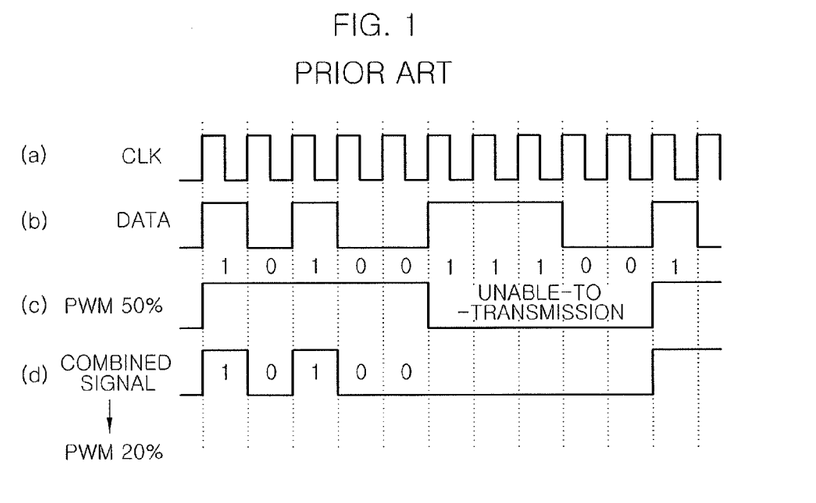
FIG. 1 is a signal waveform diagram for explaining a problem in the related art when a PWM signal of a predetermined duty cycle and predetermined transmission data are combined in synchronization with a clock signal.

In other words, it is difficult to achieve synchronization for transmitting data in a PWM signal section. For example, as shown in FIG. 1, when the PWM signal (see (c)) that has a duty cycle of 50% and the transmission data (for example, "1010011100") (see (b)) are combined in synchronization with the clock signal (see (a)), its seems the PWM signal has a duty cycle of 20%, similar to (d). As a result, the length of the turn-on section of the PWM signal is changed and the number of transmittable bits is also changed, such that the transmission speed is changed. This means that the brightness of the LED illumination is changed according to the data pattern as well as the transmission data cannot be transmitted as it is.

Therefore, a method that easily transmits the modulation signal for communication only in the turn on section of the PWM signal having a relatively long period is considered. In this case, however, the turn on time of illumination is substantially short, such that the desired brightness cannot be shown.

In this case, the visible light communication prototype of a laboratory level using the LED illumination that is in a lighted state at all time has been put on the market or parts for communicating with the LED illumination are used separately. In other words, currently, the visible light communication does not reach a level that normally carries the transmission data on light generated due to the flickering of the LED illumination.

SUMMARY OF THE INVENTION

The present invention proposes to solve the problems in the related art. It is an object of the present invention to provide an apparatus and method capable of performing visible light communication without hindering a brightness control function of illumination in an illumination device using an LED.

In order to achieve the above objects, there is provided a visible light communication apparatus including: a brightness signal generator that calculates a duty cycle of an driving signal corresponding to brightness requirement information and generates clock frequency information on brightness signals based on the calculated duty cycle; a transmission data generator that generates transmission data; an illumination driver that generates and outputs an driving signal in a pulse waveform based on the clock frequency information of the brightness signals and the transmission data and controls a pulse position of a turn on section for each bit unit time in the waveform of the driving signal based on the transmission data; and an illumination that is operated according to the driving signal from the illumination driver.

The duty cycle calculated by the brightness signal generator is a ratio that turns on the illumination per bit unit time.

The brightness signal generator converts the calculated duty cycle into the clock frequency information per bit unit time and outputs it.

The brightness signal generator includes a brightness signal calculator that calculates the duty cycle of the driving signal for illumination based on the input brightness requirement information; and a brightness signal generator that generates and outputs the clock frequency information on the brightness signals based on the duty cycle from the brightness signal calculator.

The transmission data generator includes a transmittable or non-transmittable determining unit that determines whether the duty cycle calculated in the brightness signal generator is a duty cycle that can perform the visible light communication; and a transmission data outputting unit that determines whether there are data to be currently transmitted according to the data transmittable information from the transmittable or non-transmittable determining unit and outputs the transmission data.

The transmission data outputting unit outputs virtual data of 1 or 0 when there are no information data to be transmitted.

The illumination driver positions the position of the ON section pulse in the waveform of the driving signal at a front end of bit unit time when the transmission data are "1" and positions the position of the ON section pulse in the waveform of the driving signal at a rear end of bit unit time when the transmission data are "0".

There is provided a visible light communication apparatus according to another embodiment of the present invention, including: an LED illumination; an illumination driver that mixes brightness signals for the LED illumination and transmission data to generate an driving signal in a pulse waveform for driving the LED illumination, wherein the illumination driver controls the position of the ON section pulse for each data transmission period in the waveform of the driving signal according to the transmission data.

The illumination driver positions the position of the ON section pulse in the waveform of the driving signal at a front end of the data transmission period when the transmission data are "1" and positions the position of the ON section pulse in the waveform of the driving signal at a rear end of the data transmission period when the transmission data are "0".

In addition, a visible light communication method according to a preferred embodiment of the present invention, including: generating brightness signals by a brightness signal generator that generates a duty cycle of an driving signal corresponding to brightness requirement information and calculates clock frequency information on the brightness signals based on the calculated duty cycle; generating transmission data by a transmission data generator that generates the transmission data; and driving illumination by an illumination driver that generates an driving signal in a pulse waveform to drive the illumination based on the clock frequency information on the brightness signals and the transmission data and controls the pulse position in an turn on section for each bit unit time in the waveform of the driving signal based on the transmission data.

The duty cycle is a ratio that turns on the illumination per bit unit time.

The brightness signal is a signal that converts the calculated duty cycle into the clock frequency information per bit unit time.

The generating the brightness signals includes a first step of calculating the duty cycle of the driving signal for illumination by the brightness signal calculator, based on the brightness requirement information; and a second step of generating and outputting the clock frequency information on the brightness signals by the brightness signal generator, based on the calculated duty cycle.

The generating the transmission data includes a first step of determining whether the calculated duty cycle is a duty cycle that can perform the visible light communication by the transmittable or non-transmittable determining unit; and a second step of determining whether there are data to be currently transmitted according to the data transmittable information from the transmittable or non-transmittable determining unit and outputting the transmission data by the transmission data outputting unit.

At the second step, the transmission data outputting unit outputs virtual data of 1 or 0 when there are no data to be transmitted.

The driving the illumination positions the position of the ON section pulse in the waveform of the driving signal at a front end of bit unit time when the transmission data is "1" and positions the position of the ON section pulse in the waveform of the driving signal at a rear end of bit unit time when the transmission data is "0".

With the present invention having the foregoing configuration, in the LED illumination device that can control brightness through the flickering of the LED illumination, the visible light communication can be performed while maintaining the brightness control function and the communication speed of the visible light communication.

The present invention uses a kind of a 2 pulse position modulation (2PPM) scheme that divides every predetermined time section (i.e., data transmission section) into two sections and positions a pulse at a front end when the transmission data is 1 and a pulse at a rear end when the transmission data is 0. The 2PPM scheme maintains the turn on section (pulse width) of the PWM signal of the respective period corresponding to the brightness signal and does not change the number of transmittable bits. Thereby, the brightness control is not affected at all as well as the communication speed of the visible light communication is not affected at all.

DETAILED DESCRIPTION OF THE PREFERRED EMBODIMENTS

Hereinafter, a visible light communication apparatus and method according to an embodiment of the present invention will be described with reference to the accompanying drawings.

Figure 2:
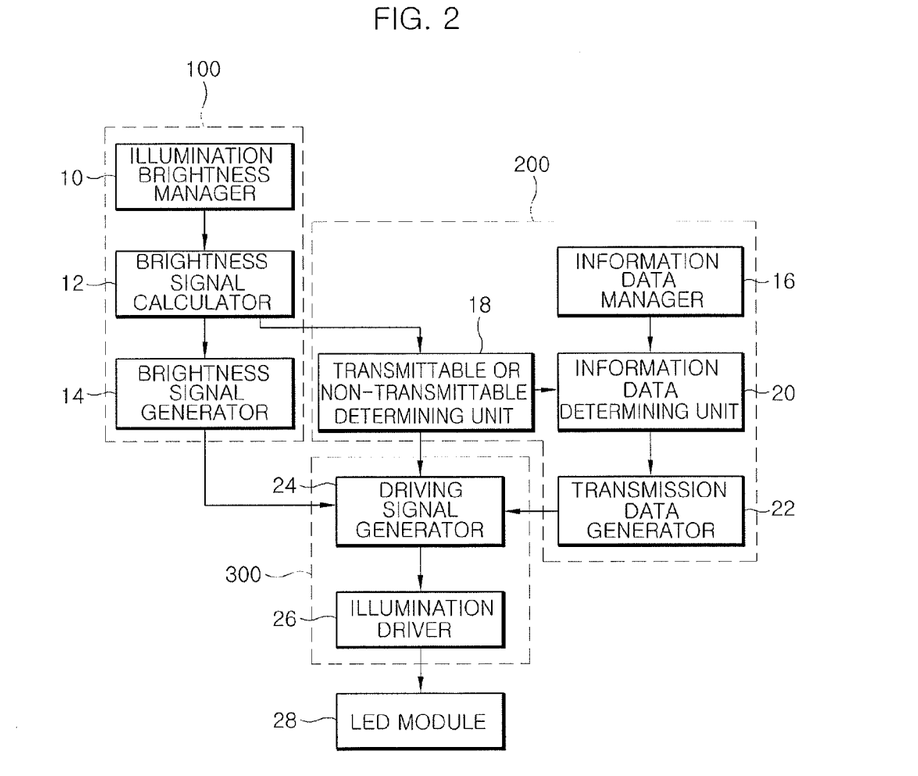
FIG. 2 is a block configuration diagram of a visible light communication apparatus according to an embodiment of the present invention.

FIG. 2 is a block configuration diagram of a visible light communication apparatus according to an embodiment of the present invention.

An embodiment of the present invention includes an illumination brightness manager 10, a brightness signal calculator 12, a brightness signal generator 14, an information data manager 16, a transmittable or non-transmittable determining unit 18, an information data determining unit 20, a transmission data generator 22, an driving signal generator 24, an illumination driver 26, and LED module 28.

The illumination brightness manager 10 analyzes a brightness requirement information input in various forms, converts it into the corresponding digital information, and then outputs it. The brightness requirement information is input in an analog or digital scheme by a user or a sensor of an illumination device. The illumination brightness manager 10 has a brightness converting function that converts the brightness requirement information input in various forms into the digital information and a brightness storing function that stores current brightness requirement information converted into digital.

The brightness signal calculator 12 calculates a duty cycle of an driving signal for an LED module 28 using the digital information output from the illumination brightness manger 10. The calculate result value is a percentage (%) unit. The duty cycle means that the LED module 28 is a turned on time per bit unit time. The bit unit time means a time necessary to represent 1 bit of data to be transmitted. The bit unit time may be referred to as a data transmission period. In other words, the calculated duty cycle means that a ratio of a turned on time of the LED module 28 per bit unit time is calculated at a creatable ratio.

The brightness signal generator 14 generates the brightness signal that will be transmitted to the driving signal generator 24. The brightness signal generator 14 converts the percentage (%) information of the duty cycle output from the brightness signal calculator 12 into the clock frequency information corresponding to the operational clock and transmission speed of the driving signal generator 24. The converted clock frequency information becomes a brightness signal that will be transmitted to the driving signal generator 24. The brightness signal to be output is output in a digital signal type having N bits.

In the embodiment of the present invention, the illumination brightness manager 10, the brightness signal calculator 12, and the brightness signal generator 14 are collectively referred to as a brightness signal generating unit 100. The brightness signal generating unit 100 calculates the duty cycle of the driving signal corresponding to the brightness requirement information and generates the clock frequency of the brightness signal based on the calculated duty cycle.

The information data manager 16 manages the information data to be transmitted by using the apparatus of the present invention. The information data to be transmitted is previously stored or is received from the external apparatus.

The transmittable or non-transmittable determining unit 18 determines whether a duty cycle is a duty cycle that can perform the visible light communication using percentage information of a duty cycle calculated in the brightness signal calculator 12. For example, the duty cycle of 0% means that the LED module 28 is turned off and the duty cycle of 100% means that the LED module 28 is turned on at all times. In the duty cycle of 0% and 100%, the communication cannot be made. The transmittable or non-transmittable determining information output from the transmittable or non-transmittable determining unit 18 is transmitted to an information data determining unit 20 and/or an driving signal generator 24.

The information data determining unit 20 determines whether there is information data to be currently transmitted based on the data transmittable information input from the transmittable or non-transmittable determining unit 18. When the information data determining unit 20 informs from the transmittable or non-transmittable determining unit 18 that the transmission can be made, it receives the information data from the information data manager 16 and transmits it to the transmission data generator 22.

The transmission data generator 22 converts the information data from the information data determining unit 20 into the transmittable data type and stores it. The conversion into the transmission data type may use a conversion technology such as line coding, scrambling, etc. that is used in general data communication and a technology such as a frame formation necessary for communication, etc. Although the detailed contents thereof are not described, those skilled in the art can sufficiently understand it through the known technologies. The transmission data generated in the transmission data generator 22 is transmitted to the driving signal generator 24.

In the embodiment of the present invention, the information data manager 16, the transmittable or non-transmittable determining unit 18, the information data determining unit 20, and the transmission data generator 22 are collectively referred to as a transmission data generating unit 200. The transmission data generating unit 200 generates the transmission data necessary for the driving signal generator 24. In FIG. 2, the information data manager 16, the information data determining unit 20, and the transmission data generator 22 are configured separately, but they may be integrally configured. When they (the information data manager 16, the information data determining unit 20, and the transmission data generator 22) are integrally configured, it is referred to as the transmission data outputting unit. In other words, the transmission data outputting unit determines whether there are data to be currently transmitted according to the data transmittable information from the transmittable or non-transmittable determining unit 18. If there are data to be currently transmitted, the transmission data is transmitted to the driving signal generator 24 as the transmission data.

The driving signal generator 24 converges the brightness signals and the transmission data according to the visible light communication speed to generate the driving signal for the LED module 28. The generation of the driving signal is performed through a modulation process into a 2 pulse position modulation (2PPM) signal based on the brightness signal from the brightness signal generator 14. The driving signal output from the driving signal generator 24 is provided as the PWM input or dimming input of the illumination driver 26.

Figure 3:
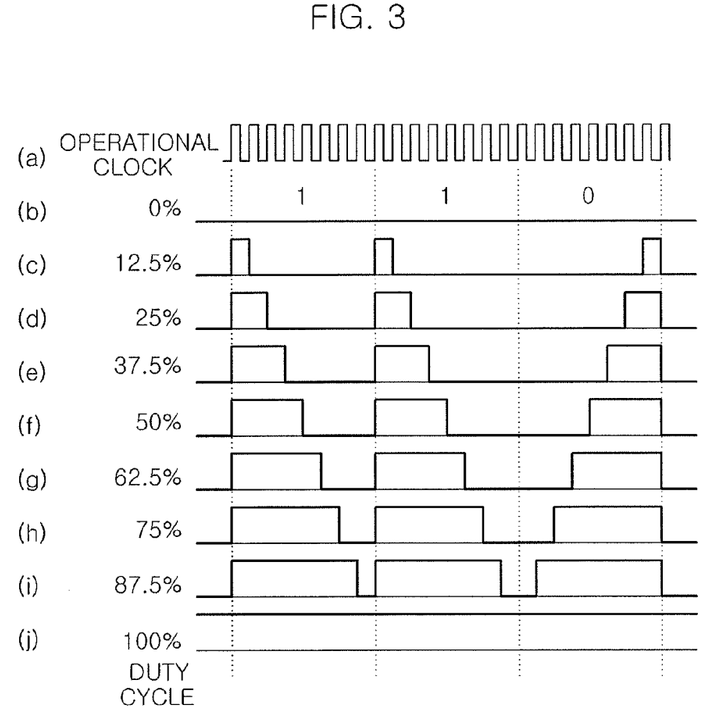
FIG. 3 is a signal waveform diagram showing an example of an output signal (illumination driving signal) from an driving signal generator shown in FIG. 2.

The modulation process into 2PPM signal will be described as follows. FIG. 3 shows a signal waveform from 0% to 100% duty cycle. In FIG. 3, reviewing the relationship between the operational clock (see (a)) and the duty cycle (see (b) to (j)), 12.5% duty cycle is generated for one clock of the operational clock. Therefore, the longer the time when the LED module 28 is turned on per bit unit time, the larger the percentage information of the duty cycle becomes. In FIG. 3, assume that the number of clocks necessary to represent 1 bit of the transmission data is 8. Therefore, 8 operational clocks necessary to transmit the transmission data of 1 bit may be referred to the data transmission period.

For example, as shown in FIG. 3(f), when the transmission data called "110" are mixed with the brightness signal having 50% duty cycle, a predetermined time section (that is, a time section where 8 clocks are sequentially operated) is divided into two sections (for example, front end and rear end) and for the data "1" to be transmitted, the pulse is positioned at the front end and for the data "0" to be transmitted, the pulse is positioned at the rear end. Of course, they may be positioned on the contrary. Thereby, the signal modulated into the 2PPM signal (that is, 2PPM modulation signal) is generated. Since the 2PPM modulation signal maintains the turn on section of the PWM signal of the duty cycle corresponding to the brightness signal as it is and the number of transmittable bits is unchanged, the brightness control is not affected at all as well as the communication speed of the visible light communication is not affected at all. The present invention uses a code scheme called a kind of the 2PPM scheme.

FIG. 3(a) is a waveform of an operational clock of the driving signal generator 24. The waveform from (c) to (j) is a waveform of the driving signal for the LED module 28 output from the driving signal generator 24. The larger the duty cycle of the waveform, the brighter the LED module 28 becomes. The waveform of FIG. 3(b) is a state where the LED module 28 is turned off and the waveform of FIG. 3(j) shows a state where the LED module 28 is completely turned on (always lighting state). The waveforms of FIGS. 3(b) and (j) show a state where the transmission data are not represented by the flickering of the LED. In this case, the transmittable or non-transmittable determining unit 18 determines that the transmission cannot be made. In some cases, in the case of FIGS. 3(c) and 3(j), since the clocks and the data information cannot be accurately recovered in converting an optical signal received in a visible light communication receiver (not shown) into an electrical signal, the transmittable or non-transmittable determining unit 18 may determine that the transmission cannot be made. In the embodiment of the present invention, the waveform of FIG. 3(f) may be the most ideal waveform of the 2PPM modulation signal.

The illumination driver 26 drives the LED module 28 based on the driving signal from the driving signal generator 24.

In the embodiment of the present invention, the driving signal generator 24 and the illumination driver 26 are collectively referred to as an illumination driving unit 300. The illumination driving unit 300 mixes the brightness signal from the brightness signal generating unit 100 and the transmission data from the transmission data generating unit 200 to generate the driving signal (that is, 2PPM modulation signal), thereby driving the LED module 28.

The LED module 29 is a single or a plurality of LED sets. The LED module 28 emits visible rays. The LED module 28 is turned on, turned off, and flickered by the illumination driver 26.

Then, the operation of the visible light communication apparatus according to the present invention will be described with reference to FIGS. 4 to 6.

Figure 4:
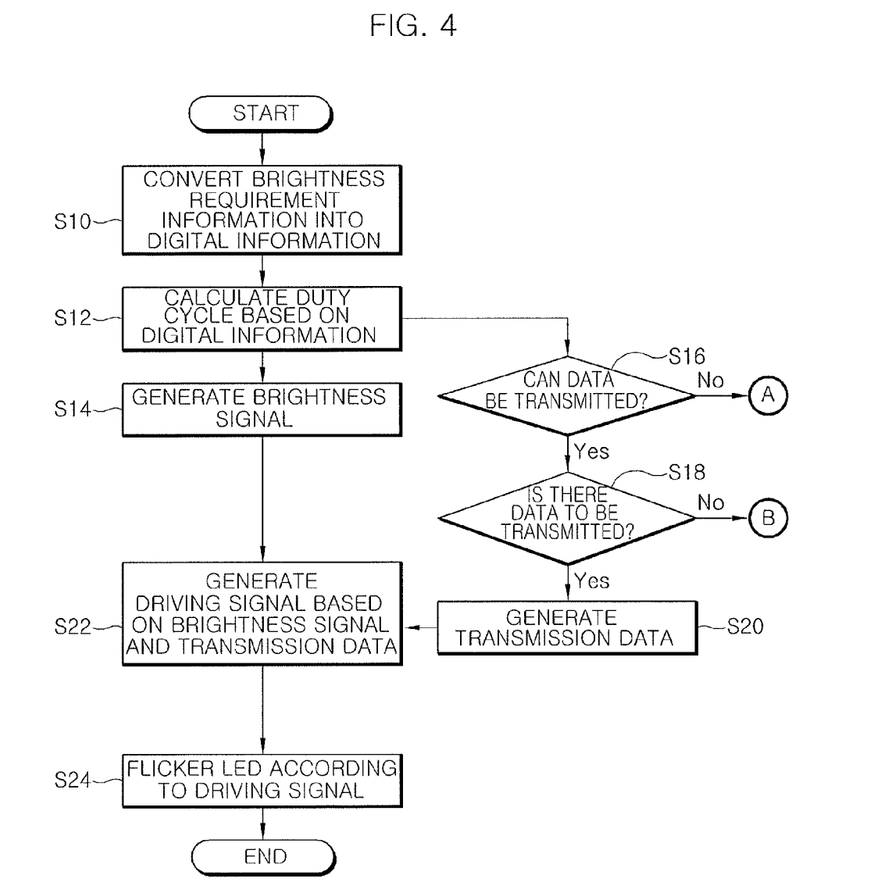
FIG. 4 is a flowchart for explaining a process that synthesizes brightness signals and transmission data in a visible light communication method according to an embodiment of the present invention to generate an LED driving signal.

First, a process of generating the LED driving signal by synthesizing the brightness signal and the transmission data is described based on a flowchart of FIG. 4.

The illumination brightness manager 10 analyzes the brightness requirement information input in various types and converts it into the corresponding digital information. For example, the illumination brightness manager 10 converts and outputs the brightness requirement information input in the analog or digital scheme by the user of the illumination device, the sensor, etc. into the digital information that can be stored.

The brightness signal calculator 12 calculates the duty cycle of the driving signal based on the digital information from the illumination brightness manager 10 (S12). That is, the brightness signal calculator 12 calculates a ratio of time when the LED module 28 is turned on per bit unit time by the creatable ratio and then represents it by a percentage (%).

The brightness signal generator 14 converts the duty cycle of the driving signal calculated in the brightness signal calculator 12 into the clock frequency information to correspond to the operational clock and transmission speed of the driving signal generator 24. The bit unit time and the number of clocks per bit unit time are different according to the operational clock and transmission speed of the driving signal generator 24. For example, as the transmission speed is high, the bit unit time is short and the number of clocks per bit unit time is getting smaller. Thereby, the brightness signal generator 14 converts the brightness in a percentage unit into the number of clocks used in the duty cycle (S14). The brightness signal output from the brightness signal generator 14 (that is, the number of clocks used in the duty cycle) is transmitted to the driving signal generator 24.

Meanwhile, the duty cycle of the driving signal calculated in the brightness signal calculator 12 is transmitted to the transmittable or non-transmittable determining unit 18. Accordingly, the transmittable or non-transmittable determining unit 18 determines the data transmission or not by using the duty cycle of the driving signal from the brightness signal calculator 12 (S16). That is, if the illumination device is too dark or bright, the data cannot be transmitted. For example, if the duty cycle of the driving signal from the brightness signal calculator 12 means that the LED module 28 is turned off or turned on at all times, the transmittable or non-transmittable determining unit 18 determines that the data cannot be transmitted.

If the data can be transmitted ("Yes" at S16), the transmittable or non-transmittable determining unit 18 transmits the information informing that the transmission can be made to the information data determining unit 20 and the driving signal generator 24.

Thereby, the information data determining unit 20 determines whether there are the information data to be currently transmitted based on the information informing that the transmission can be made (S18). That is, the information data determining unit 20 determines whether there are the information data input from the information data manager 16 and then, if there is the information data, transmits it to the transmission data generator 22. The transmission data generator 22 converts the input information data into the transmittable type, stores it, and then transmits it to the driving signal generator 24 (S20).

The driving signal generator 24 generates driving signal (that is, 2PPM modulation signal) based on the information related to the brightness signal from the brightness signal generator 14 and the transmission data from the transmission data generator 22 (S22). The driving signal generated from the driving signal generator 24 becomes various as in FIG. 3. For example, as shown in FIG. 3(f), when the transmission data called "110" are mixed with the brightness signal having 50% duty cycle, a predetermined time section (that is, a time section where 8 clocks are sequentially operated) is divided into two sections (for example, front end and rear end) and for the data "1" to be transmitted, the pulse is positioned at the front end and for the data "0" to be transmitted, the pulse is positioned at the rear end. Of course, they may be positioned on the contrary. Thereby, the signal modulated into the 2PPM signal (that is, 2PPM modulation signal) is generated. Since the 2PPM modulation signal maintains the turn-on section of the PWM signal of the duty cycle corresponding to the brightness signal as it is and the number of bits is unchanged, the brightness control is not affected at all as well as the communication speed of the visible light communication is not affected at all. In particular, as shown in FIGS. 3(b) to (j), the signal waveform having the turn on (ON) of the PWM signal can be output, such that the various brightness controls of the LED module 29 can be sufficiently performed.

The illumination driver 26 drives the LED module 28 based on the driving signal from the driving signal generator 24 (S24). Thereby, the LED module 28 is flickered.

Therefore, the visible light communication receiver (not shown) performs photoelectric conversion on the received visible rays and reads data according to the result.

Figure 5:
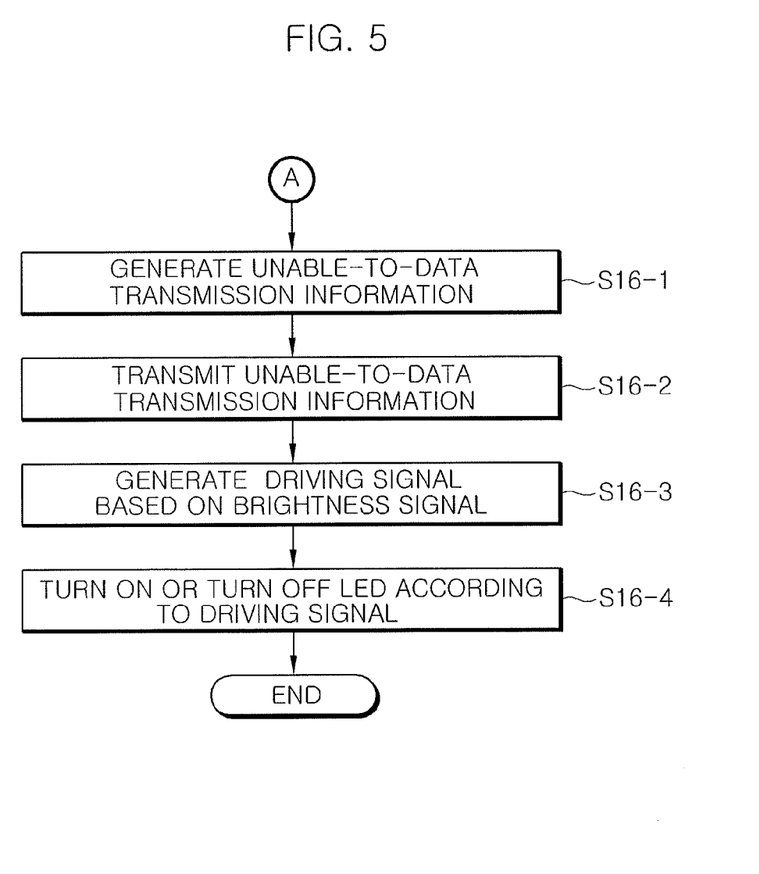
FIG. 5 is a flowchart for explaining on operation when data cannot be transmitted in the visible light communication method according to the embodiment of the present invention.

FIG. 5 is a flowchart for explaining on operation when data cannot be transmitted in the visible light communication method according to the embodiment of the present invention.

When the data cannot be transmitted at step S16 of FIG. 4, that is, the duty cycle of the driving signal from the brightness signal calculator 12 means that the LED module 28 is turned off or turned on at all times ("No" at step S16), the transmittable or non-transmittable determining unit 18 determines that the data cannot be transmitted. Thereby, the transmittable or non-transmittable determining unit 18 generates the corresponding information (that is, unable-to-data transmission information) (S16-1).

The transmittable or non-transmittable determining unit 18 transmits the generated unable-to-data transmission information to the driving signal generator 24 (S16-2).

Thereby, the driving signal generator 24 generates the driving signal based on the brightness signal from the brightness signal generator 14 (S16-3). In this case, since there is no need to generate the 2PPM modulation signal, the driving signal generator 24 generates the driving signal having the general signal waveform as shown in FIG. 3(b) or 3(j).

The illumination driver 26 turns on or turns off the LED module 28 based on the driving signal from the driving signal generator 24 (S16-4).

Figure 6:
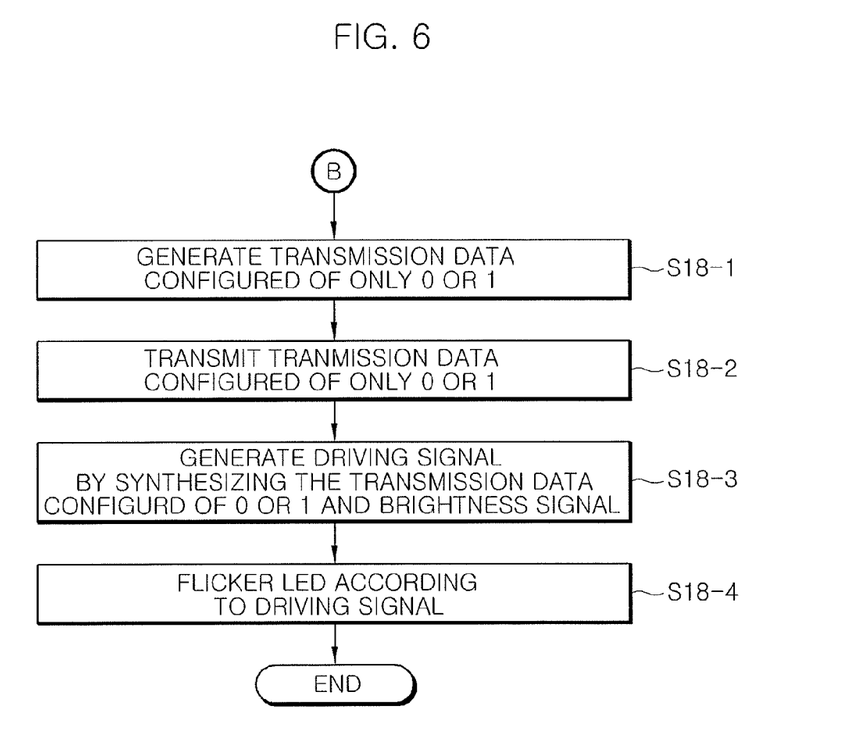
FIG. 6 is a flowchart for explaining on operation when there are no data to be transmitted in the visible light communication method according to the embodiment of the present invention.

FIG. 6 is a flowchart for explaining on operation when there are no data to be transmitted in the visible light communication method according to the embodiment of the present invention.

When there are no data to be transmitted at step S18 of FIG. 4, that is, the data can be transmitted. However, when there is no data to be transmitted ("No" at S18), the information data determining unit 20 generates the information informing that there are no data to be transmitted (for example, transmission data configured of only "0" or "1", where the transmission data may be the digital information pattern) (S18-1).

The information data determining unit 20 transmits the generated information (i.e. transmission data configured of only "0" or "1" as the information informing that there are no data to be transmitted) to the transmission data generator 22.

The transmission data generator 22 transmits the input transmission data, that is, the data meaning the information informing that there are no data to be transmitted to the driving signal generator 24 (S18-2).

The driving signal generator 24 generates driving signal (that is, 2PPM modulation signal) based on the information related to the brightness signal from the brightness signal generator 14 and the transmission data from the transmission data generator 22 (that is, transmission data informing that there are no data to be transmitted) (S18-3). In this case, in the driving signal generator 24, the pulse for each bit unit generates the driving signal in a type positioned at all the front end or the rear end, unlike the signal waveform of FIG. 3.

The illumination driver 26 drives the LED module 28 based on the driving signal from the driving signal generator 24 (S18-4). Consequently, the LED module 28 performs the flickering according to the brightness signal.

Therefore, the visible light communication receiver (not shown) performs photoelectric conversion on the received visible rays and reads data (that is, read that there is no data) according to the result.

In the foregoing description, every data transmission section is largely divided into two sections and when the transmission data is 1, the pulse is positioned at the front section and when the transmission data is 0, the pulse is positioned at the rear section. For example, it can be considered that every data transmission section is divided into four sections. Of course, when every data transmission section is divided into four sections and the position of the pulse is controlled according to the transmission data, the allowable duty cycle will be limited more than the foregoing embodiments.

The present invention is not limited to the foregoing embodiments, but the embodiments may be configured by selectively combining all the embodiments or some of the embodiments so that various modifications can be made.

What is claimed is:

1. A visible light communication apparatus, comprising:
   a brightness signal generator that makes a pulse width of an ON section pulse to be adjusted according to brightness requirement information by using a duty cycle corresponding to a turn-on period of a visible light source per bit unit time;
   an illumination driver that adjusts a pulse position of the ON section pulse to distinguish bit data for representing "1" from bit data for representing "0" for each bit unit time while the pulse width of the ON section pulse is sustained for a respective period;
   a transmittable or non-transmittable determining unit that determines whether the duty cycle is an applicable duty cycle or not; and
   a transmission data outputting unit that outputs transmission data to be transmitted using the pulse position of the ON section pulse according to the determining result of the transmittable or non-transmittable determining unit,
   wherein the ON section pulse has a constant pulse amplitude, and has the pulse width for adjusting brightness,
   wherein the pulse position is one of two positions in the bit unit time,
   wherein the pulse position corresponds to
      a transition from 'high' to 'low' in the bit unit time when the bit data correspond to "0", and
      a transition from 'low' to 'high' in the bit unit time when the bit data corresponds to "1".

2. The visible light communication apparatus according to claim 1, wherein the pulse position is a front end of the bit unit time when the bit data correspond to "0", and a rear end of the bit unit time when the bit data correspond to "1".

3. The visible light communication apparatus according to claim 1, wherein the transmission data outputting unit outputs virtual data of "1" or "0" when there are no information data to be transmitted.

4. The visible light communication apparatus according to claim 1, wherein the duty cycle is used for generating a clock frequency information, the clock frequency information used for generating the pulse width of the ON section pulse per bit unit time.

5. A visible light communication method, comprising:

adjusting a pulse width of an ON section pulse according to brightness requirement information by using a duty cycle corresponding to a turn-on period of a visible light source per bit unit time;

adjusting a pulse position of the ON section pulse to distinguish bit data for representing "1" from bit data for representing "0" for each bit unit time while the pulse width of the ON section pulse is sustained for a respective period;

determining whether the duty cycle is an applicable duty cycle or not; and outputting transmission data to be transmitted using the pulse position of the ON section pulse according to the determining result, wherein the ON section pulse has a constant pulse amplitude, and has the pulse width for adjusting brightness, wherein the pulse position is one of two positions in the bit unit time, wherein the pulse position corresponds to a transition from 'high' to 'low' in the bit unit time when the bit data correspond to "0", and a transition from 'low' to 'high' in the bit unit time when the bit data corresponds to "1".

6. The visible light communication method according to claim 5, wherein the pulse position is a front end of the bit unit time when the bit data correspond to "0", and a rear end of the bit unit time when the bit data correspond to "1".

7. The visible light communication method according to claim 5, wherein the outputting transmission data outputs virtual data of "1" or "0" when there are no information data to be transmitted.

8. The visible light communication method according to claim 5, wherein the duty cycle is used for generating a clock frequency information, the clock frequency information used for generating the pulse width of the ON section pulse per bit unit time.

* * * * *